(12) United States Patent
Tanaka (10) Patent No.: US 6,707,585 B2
(45) Date of Patent: Mar. 16, 2004

(54) HOLOGRAPHIC RECORDING AND REPRODUCING APPARATUS AND HOLOGRAPHIC RECORDING AND REPRODUCING METHOD

(75) Inventor: Satoru Tanaka, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/984,841

(22) Filed: Oct. 31, 2001

(65) Prior Publication Data

US 2002/0080434 A1 Jun. 27, 2002

(30) Foreign Application Priority Data

Oct. 31, 2000 (JP) .................................. 2000-332825

(51) Int. Cl.[7] .................................................. G03H 1/04
(52) U.S. Cl. ........................... 359/35; 359/11; 359/33
(58) Field of Search ................................ 359/35, 11, 1, 359/29, 30, 31, 32, 33, 10; 369/103; 365/124, 125, 216

(56) References Cited

U.S. PATENT DOCUMENTS 5,132,811 A * 7/1992 Iwaki et al. .................. 359/6
5,978,108 A * 11/1999 Bai et al. ...................... 359/3
6,049,402 A * 4/2000 Burr ............................ 359/22

OTHER PUBLICATIONS

P. Hariharan, "Optical Holography: Principles, techniques, and applications", Cambridge University Press, New York, 1996, pp. 119–122.*

* cited by examiner

Primary Examiner—Thong Nguyen
Assistant Examiner—Arnel C. Lavarias
(74) Attorney, Agent, or Firm—Sughrue Mion, PLLC (57) ABSTRACT

An apparatus includes recording reference optics, recording signal optics, and reproducing reference optics. The recording reference optics supplies a recording reference light beam to a recording medium, and the recording signal optics supplies a signal light beam, which is modulated in accordance with image data, to the recording medium. The signal light beam and the recording reference light beam produce an interference pattern within the recording medium. The reproducing reference optics supplies a reproducing reference light beam, which propagates in an opposite direction of the recording reference light beam, to the recording medium. The reproducing reference light beam generates a phase conjugate wave from a refractive-index grating of the interference pattern, and the phase conjugate wave is split from an optical path of the signal light beam to image a dot pattern with the phase conjugate wave. Also, a photodetector detects the dot pattern to reproduce image data.

18 Claims, 5 Drawing Sheets

HOLOGRAPHIC RECORDING AND REPRODUCING APPARATUS AND HOLOGRAPHIC RECORDING AND REPRODUCING METHOD

BACKGROUND OF THE INVENTION

1. Field of the Invention

The present invention relates to a holographic recording and reproducing apparatus and a holographic recording and reproducing method.

2. Description of the Related Art

A holographic memory system is known as a digital information recording system which applies the principle of holography utilizing a recording medium formed of a photorefractive material, i.e. so-called a holographic memory. In this information recording system, the recording information signals are recorded as changes in refractive index on the recording medium of a photorefractive crystal such as lithium niobate single crystals.

There is a conventional holographic recording and reproducing method utilizing the Fourier transform.

Figure 1:
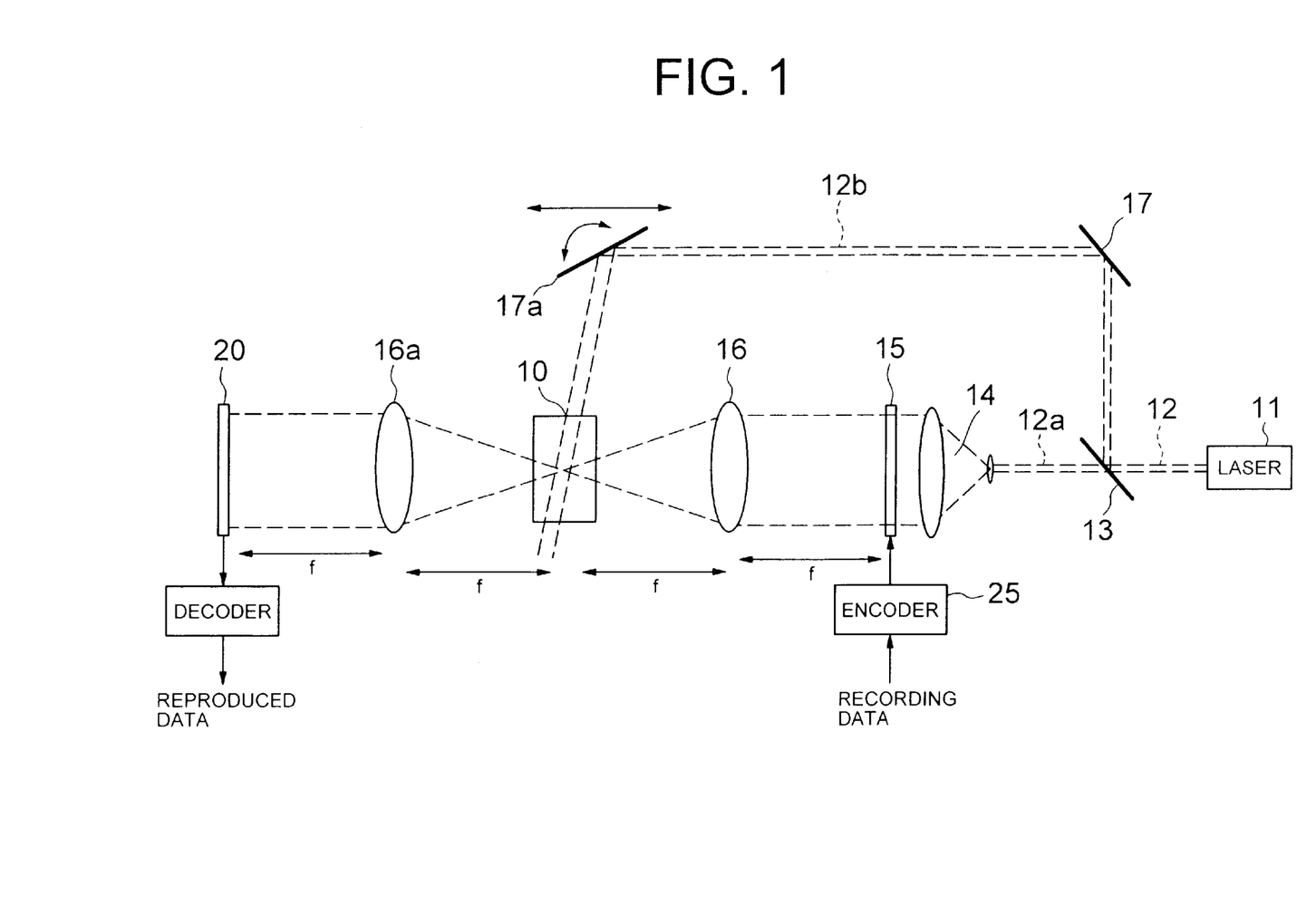
FIG. 1 is a diagram illustrating the structure of a conventional volume holographic memory system.

FIG. 1 shows a conventional 4f-based holographic recording and reproducing apparatus. A laser light beam 12 emitted from a laser light source 11 is split into a signal light beam 12a and a reference light beam 12b in a beam splitter 13. The signal light beam 12a is expanded in its diameter by a beam expander 14 as collimated light, and then irradiated to a spatial light modulator (hereinafter abbreviated as "SLM") 15 including a dot matrix panel such as a transmission-type TFT liquid crystal display (LCD) panel to which image data to be recorded are provided which are converted by an encoder as electric signals. Thus, the panel forms a bright and dark dot pattern on its plane corresponding to the image data. The signal light beam 12a is optically converted by the dot matrix panel 15 to include data signal components. The signal light beam 12a including dot pattern signal components passes through a Fourier transforming lens 16 which is positioned at a focal distance f apart from the SLM 15. The Fourier transforming lens 16 performs Fourier transformation and then the signal light beam 12a including dot pattern signal components is converged into a recording medium 10. On the other hand, the reference light beam 12b split in the beam splitter 13 is guided to the recording medium 10 by a fixed mirror 17 and a rotary mirror 17a, and intersects an optical path of the signal light beam 12a within the recording medium 10 to form a light interference pattern. The recording medium 10 made of a photorefractive crystal records the spatial intensity modulation represented by the light intensity of the light interference pattern as changes in refractive index corresponding to the data.

In the foregoing manner, the diffraction light from the image data illuminated by a coherent collimated light is focused through the Fourier transforming lens 16 and changed into a distribution on the focal plane, or Fourier plane. The distribution as a result of Fourier transformation is interfered with the coherent reference light to record an interference fringe thereof to the recording medium placed in the vicinity of the focal point. Ending the record of the first page, the rotary mirror 17a is rotated a predetermined amount and parallel moved in position a predetermined amount so that the incident angle of the recording reference light beam 12b on the recording medium 10 is changed to record the second page by the same procedure. In this way, the angle-multiplexed recording is carried out with sequential recording as the above.

In reproducing information, on the other hand, inverse Fourier transformation is carried out to reproduce a dot-pattern image. As shown in FIG. 1 the optical path of the signal light beam 12a is cut off, for example, by the SLM 15 to illuminate only the recording reference light beam 12b to the recording medium 10. In order to make incident the recording reference light beam 12b at the same angle as the recording reference light of upon recording the page to be reproduced, the rotary mirror 17a is changed and controlled in position and angle by the combination of mirror rotation and parallel movement. Reproductive light of the recorded interference pattern appears at an opposite side of the recording medium 10 to the side illuminated by the signal light beam 12a. If the reproduced light is guided to and inverse-Fourier-transformed by an inverse Fourier transforming lens 16a, the dot-pattern signal can be reproduced. Furthermore, if the inverse Fourier transforming lens 16a images the dot-pattern signal on an imaging device or photodetector 20 using a CCD (Charge Coupled Device) or CMOS sensor arranged in the focal point, and reconverted into an electric digital data signal and then sent to a decoder 25, the original data is reproduced.

In this manner, the holographic memory system achieves a great capacity recording of information by multiplexedly recording a great deal of two dimensional data to a certain volume of the recording medium.

The holographic memory system using a photorefractive phenomenon for the recording principle. There is no threshold of recording and deterioration in date within the holographic memory. This matter implies that reference light irradiated to the medium for reproduction gradually erases the recorded hologram which is so called deterioration of reproduction. In the multiplexed recording of information carried out sequentially recording within a certain limited volume of the medium, the first recorded portion suffers from the deterioration of the following recorded portion due to the photorefractive phenomenon having no threshold. Thus the surplus recording is performed in counterbalance to such a deterioration so as to compensate the erased hologram portion. For this, the renewal of recording for so-called scheduling time is required as a so-called refresh operation. The refresh operation should be performed in one lump sum to the entire medium. Thus it is impossible that only one portion of the great quantity of multiplexedly recorded data is partly rewritten by a user as he likes without influencing the other portion in the medium.

In this way, a conventional holographic memory system has any nonvolatile storage and it is difficult to provide a rewritable storage. Further it is hard to partially rewrite an extremely minute portion of the great deal of data stored at a limited one volume region in the recording material because the rewriting of such a minute portion adversely influences the other portion storing the other data.

OBJECT AND SUMMARY OF THE INVENTION

Thus the present invention has been made in consideration of the above conditions, and an object of the present invention is to provide an apparatus of holographic recording and reproducing and a method therefor in which the user is allowed to rewrite the recorded data in the holographic memory.

According to the present invention, there is provided a holographic recording and reproducing apparatus for recording data on a recording medium and reproducing data from the recording medium, the recording medium being made of a photorefractive material, said apparatus comprising:

a support portion for detachably supporting the recording medium;

a recording-reference-light-beam-supplying-portion for supplying a coherent recording reference light beam having a first wavelength and propagating along a recording optical axis to a major surface of said recording medium;

a signal-light-beam-supplying-portion including a converging lens for converging a coherent signal light beam having the first wavelength which is modulated in accordance with image data, in an optical path into the recording medium such that said signal light beam intersects with the recording reference light beam to produce an optical interference pattern of refractive index with said reference and signal light beams within said recording medium;

a reproducing-reference-light-beam-supplying-portion for supplying into the recording medium a coherent reproducing reference light beam having the first wavelength and propagating in an opposite direction along said recording optical axis of the recording reference light beam to generate a phase conjugate wave from a refractive-index grating of the light interference pattern;

a photo-detecting portion including a receiving lens for receiving said phase conjugate wave and a photo-detector for detecting the dot pattern imaged with said phase conjugate wave to reproduce the image data; and an image-formation-plane-generating portion for making image-formation planes of said receiving lens and said converging lens coincide with each other to generate a common image-formation plane.

According to one aspect of the present invention of the holographic recording and reproducing apparatus, said image-formation-plane-generating portion includes half mirrors symmetrically disposed with respect to said common image-formation plane in optical paths of said signal-light-beam-supplying-portion and said photo-detecting portion respectively.

According to another aspect of the present invention of the holographic recording and reproducing apparatus, said receiving lens and said converging lens are Fourier transforming lenses symmetrically disposed with respect to said common image-formation plane in optical paths of said signal-light-beam-supplying-portion and said photo-detecting portion respectively.

According to a further aspect of the present invention of the holographic recording and reproducing apparatus, said recording medium has a parallel plate shape.

According to a still further aspect of the present invention, the holographic recording and reproducing apparatus further comprises a gate-light-beam-supplying-portion for irradiating a gate light beam having a second wavelength to a region intersected with said signal light beam and said recording reference light beam within the recording medium in a limited manner to enhance a recording sensitivity of said recording medium.

According to another aspect of the present invention, the holographic recording and reproducing apparatus further comprises a pre-irradiation-beam-supplying-portion for irradiating a pre-irradiation beam having a third wavelength to color said recording medium.

According to the present invention, there is also provided a holographic recording and reproducing method for recording data on a recording medium and reproducing data from the recording medium, the recording medium being made of a photorefractive material, said method comprising the steps of:

making a coherent recording reference light beam having a first wavelength and propagating along a recording optical axis incident onto a major surface of the recording medium;

converging by a converging lens a coherent signal light beam having the first wavelength which is modulated in accordance with image data, in an optical path into the recording medium such that said signal light beam intersects with the recording reference light beam to produce an optical interference pattern of refractive index with said reference and signal light beams within said recording medium;

making a coherent reproducing reference light beam having the first wavelength incident to the recording medium in such a manner that the reproducing reference light beam propagates in an opposite direction along said recording optical axis of the recording reference light beam to generate a phase conjugate wave from a refractive-index grating of the light interference pattern;

providing a receiving lens for receiving said phase conjugate wave and a photo-detector for detecting the dot pattern imaged with said phase conjugate wave to reproduce the image data; and making image-formation planes of said receiving lens and said converging lens coincide with each other to generate a common image-formation plane.

According to one aspect of the present invention, said holographic recording and reproducing method further comprises the steps of:

producing a phase conjugate wave by irradiating the reproducing reference light beam to a reproduction channel of the refractive-index grating previously recorded in the recording medium in such a manner that said receiving lens reconstructs a real image of the image data on the common image-formation plane of said receiving lens and said converging lens; and during both the irradiation of the recording reference light beam and the production of the phase conjugate wave, forwarding a reproduced light from the real image to said converging lens to converge it into the recording medium in such a manner that said reproduced light intersects with the recording reference light beam to produce an optical interference pattern of refractive index at a different portion away from said reproduction channel in said recording medium.

According to a further aspect of the present invention, said holographic recording and reproducing method further comprises a step of switching an operation, from the forwarding step of the reproduced light to said converging lens, to the irradiating step of converging by the converging lens a coherent signal light beam having the first wavelength which is modulated in accordance with another image data into the recording medium, simultaneously making the recording reference light beam incident onto the recording medium, to produce an optical interference pattern of refractive index following to said different portion of said reproduction channel.

According to a still further aspect of the present invention, said holographic recording and reproducing method further comprises a step of irradiating a gate light beam having a second wavelength to a region intersected with said signal light beam and said recording reference light beam within the recording medium in a limited manner to enhance a recording sensitivity of said recording medium.

According to another aspect of the present invention, said holographic recording and reproducing method further comprises a step of irradiating a pre-irradiation beam having a third wavelength to color said recording medium.

DETAILED DESCRIPTION OF THE PREFERRED EMBODIMENTS

Preferred embodiments according to the present invention will be described with reference to the accompanying drawings hereinafter.

A photorefractive material such as $LiNbO_3$ crystal doped with Tb is transparent with no coloring. This photorefractive crystal exhibits the light induced absorption (photochromism) by illuminating with an ultraviolet ray with a wavelength of about 313 nm at the irradiated portion thereof and resulting in coloring. In this time, the illuminated hologram portion is erased or initialized because the distribution of electric charges is homogenized by the ultraviolet rays in the recording material. When a visible light having a wavelength of 436 nm is irradiated to the colored portion of the recording material, then a light induced absorption or recording sensitivity appears in the near infrared ray band. On the other hand, when no light irradiation of wavelength of 436 nm, the recording sensitivity is extremely reduced with respect to the near infrared light. Therefore such a visible light beam is so called gate light beam, and the ultraviolet light beam which is previously illuminated is so called pre-irradiation light. In addition, the near infrared ray beam used for the recording is used for signal light and reference light. Therefore an operation that the gate light beam or the pre-irradiation light is used properly realizes a development of the recording sensitivity or the initialization in only a specific portion of the recording material, so that the recording channel and the reproduction channel are formed distinctly in separate portions of the medium. The present invention includes such a memory system in that, by using two kinds of light having different wavelengths from each other, the holographic recording is carried out within the recording material made of the photorefractive material exhibiting the photochromism. This recording is so called two-color holographic recording. In the two-color holographic recording, the gate light beam of the second wavelength different from the first wavelength of the signal and reference light beams is introduced into the medium for increasing the photo-sensitivity thereof, while the signal and reference light beams are irradiated thereto, so that interference fringes of refractive index are recorded at a site in which the signal and reference light beams as well as the gate light beam intersect with each another.

Figure 2:
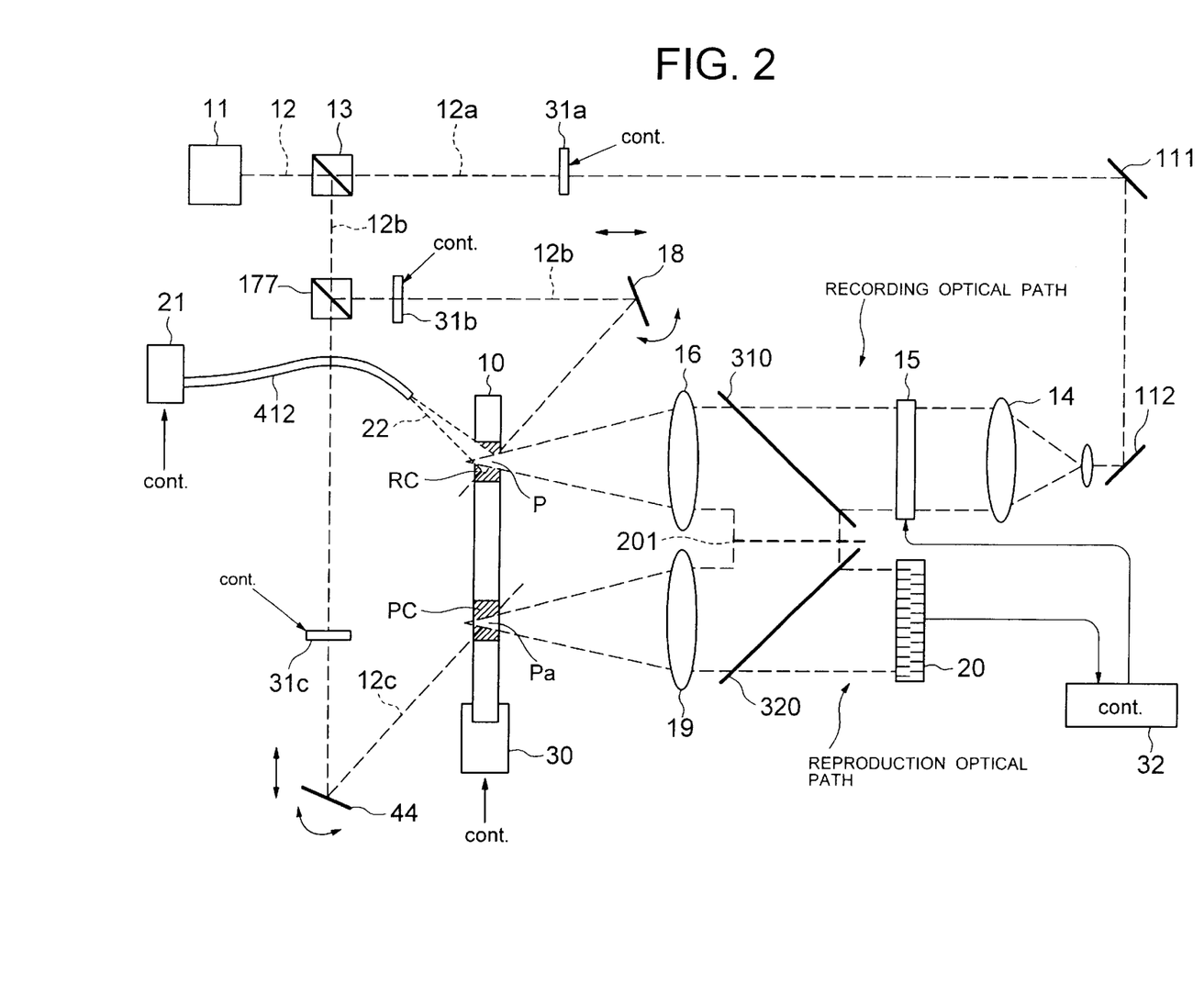
FIGS. 2 to 5 are plan views each illustrating the structure of a holographic recording and reproducing apparatus of an embodiment according to the present invention.

As shown in FIG. 2, a laser light source 11 of e.g., a wavelength of 532 nm for generation of signal light and reference light is a combination of a YAG laser and a SHG device. The laser light beam 12 emitted from the light source 11 is split into a signal light beam 12a and a recording reference light beam 12b by a beam splitter 13. The signal light beam 12a and the recording reference light beam 12b are irradiated to the same position P in a recording medium 10 by way of different optical paths, respectively.

On the optical path of the signal light beam 12a, arranged are a shutter 31a, mirrors 111 and 112, a beam expander 14, an SLM 15 e.g., a transparent LCD device, a half mirror 310, and a Fourier transforming lens 16 e.g., a converging lens. The shutter 31a is provided to open and close the optical path of the signal light beam 12a, and also shutters 31b and 31c are provided to open and close the optical paths of light beams 12b and 12c, respectively. These shutters are driven to open and close by the corresponding drivers (not shown) in response to signals forwarded from a controller 32. The beam expander 14 magnifies the diameter of the signal light beam 12a which passes through the shutter 31a and mirrors 111 and 112 to make a collimated ray to be incident at a predetermined angle e.g. right angle on the SLM 15. The SLM 15 is connected to the controller 32 including an encoder to receive the electric data in a unitary page series corresponding to a two-dimensional page received by the latter, and then forms a bright and dark dot pattern on its plane panel corresponding to the image data. The passed signal light beam 12a is optically modulated by the SLM 15, to contain data as a dot-matrix component. The Fourier transforming lens 16 performs Fourier transformation on the dot-matrix component of the signal light beam 12a passing through the half mirror 310 and focuses it slightly in the front or back of a recording channel at a position P in the recording medium 10. The SLM 15 is disposed at the other focal point of the Fourier transforming lens 16. The optical path on which the beam expander 14, the SLM 15, the half mirror 310 and the Fourier transforming lens 16 are disposed is so-called a recording optical path.

A beam splitter 177, a shutter 31b and a galvanic mirror 18 are disposed on the optical path of the recording reference light beam 12b split by the beam splitter 13. The recording reference light beam 12b reflected through the beam splitter 177 is guided by the galvanic mirror 18 into the position P of the recording medium 10 in a similar manner as the signal light beam 12a. The galvanic mirror 18 regulates the recording axis of the recording reference light beam 12b. The shutter 31b is driven to open and close by a driver in response to a signal sent from the controller 32.

As shown in FIG. 2, the irradiation light source 21 including a filter replaceable system, e.g., PHOTOCURE 200 (HAMAMATSU-PHOTONICS Ltd.) is used for both the pre-irradiation light in the ultraviolet ray wavelength-band and the gate light beam in a shorter wavelength of the visible light wavelength-band. The irradiation light source 21 generates ultraviolet light of a wavelength of 313 nm with a sufficient power to develop light induced absorption, i.e., coloring of the recording medium 10 by its irradiating light, by exchanging the filter. Light 22 generated from the irradiation light source 21 is irradiated through an optical fiber 412 to the recording channel of the recording medium 10, i.e., the recording position P. The irradiations of the gate light beam and the pre-irradiation light 22 are ON/OFF controlled in response to a signal sent by a controller 32. The gate light beam is limitedly irradiated to the position P within the recording material at which the signal and reference light beams intersect with each another. Alternatively the pre-irradiation light source 21 may be a light source capable of converging the light beam onto the position P within the entire recording medium 10 while decreasing the diameter of its light spot. In the recording medium 10 illuminated with the pre-irradiation light 22, a light interference pattern is formed by the reference light and the signal light in a region at the position P within the recording medium 10, and information is recorded therein as a change in refractive index.

A shutter 31c and a galvanic mirror 44 are disposed on the optical path of the reproducing reference light beam 12c in which the beam splitter 177 splits the reproducing reference light beam 12c from the recording reference light beam 12b to guide it to the shutter 31c. The shutter 31c is driven to open and close by a driver in response to a signal sent from the controller 32. The galvanic mirror 44 guides the passed reproducing reference light beam 12c into the position Pa of the recording medium 10. The galvanic mirror 44 regulates the reproduction axis of the reproducing reference light beam 12c. During the holographic recording and rewriting, the shutter 31c is opened and the reproducing reference light beam 12c is irradiated to the recording medium 10 with a predetermined orientation. In the reproducing method using a phase conjugate wave, there is a need to make the recording and the reproducing reference light beams 12b and 12c in a symmetric nature. For both of the two light beams, planar waves or spherical waves are used which symmetrically propagates opposite to each other in an axis. Thus, the reproducing reference light beam 12c is supplied so as to illuminate the region Pa of the recording medium 10 at the opposite side of the recording medium 10 through the optical path of the shutter 31c and the galvanic mirror 44. Namely, the reproducing reference light beam 12c is made incident on the recording medium 10 by the galvanic mirror 44 so as to propagate in the reverse propagating direction and parallel to the recording reference light beam 12b, thereby causing a phase conjugate wave from the refractive-index grating of region Pa corresponding to the light interference pattern of the medium. Consequently, reproductive light from the region Pa appears at the same side of the recording medium 10 as the side illuminated by the signal light beam 12a. The interference pattern light (phase conjugate wave) propagates to a Fourier transforming lens 19 of a receiving lens. The Fourier transforming lens 19 receives and forwards the interference pattern light through the half mirror 320 to the photoelectric converting elements of a photodetector 20 using a CCD 20 on which the bright and dark dot pattern is reproduced. The Fourier transforming lens 19 is disposed in the reproduction axis so that focuses light slightly in the front or back of the reproduction channel at a position Pa in the recording medium 10. That is, the Fourier transforming lens 19 reconstructs the bright and dark dot pattern on the CCD 20. The CCD 20 converts the dot pattern into an electric digital data signal. Then the CCD 20 forwards the data to the controller 32 by which the original data is reproduced.

The half mirror 320 is disposed in a reproduction optical path so as to divide a parallel light beam of the phase conjugate wave converted by the Fourier transforming lens 19 into two beams, i.e., one half being introduced to the CCD 20, the half being reflected back to the reproduction optical path through a common image-formation plane 201. In the reproduction optical path, the Fourier transforming lens 19, the half mirror 320 and the CCD 20 are aligned. The Fourier transforming lenses 16 and 19 and the half mirrors 310 and 320 are disposed such that the common image-formation plane 201 becomes an image-formation plane of the Fourier transforming lens 19 reflected by the half mirror 320 and, at the same time, also an image-formation plane of the Fourier transforming lens 16 reflected by the half mirror 310. That is, the recording optical path in which the signal light beam propagates to the recording position RC of the recording material and the reproduction optical path in which the phase conjugate wave generated from the reproduction position PC propagates back to the CCD 20 are disposed to be symmetric with respect to the common image-formation plane 201 to each other together with optical components thereof. In the case that the recording material has a parallel plate shape which has a front and rear major surfaces parallel to each other defining the medium form, the recording optical path and the reproduction optical path are disposed to be parallel to each other. Thus, in a single piece type light pickup head constructed for the holographic recording, the Fourier transforming lenses 16 and 19 are fixed in the same plane on a lens support, and the SLM 15 and the CCD 20 are fixed in the same plane on the opposite support parallel to the lens support. The half mirrors 310 and 320 are fixed in the recording optical path and the reproduction optical path respectively in such a manner that the half mirror 310 between the Fourier transforming lens 16 and the SLM 15 and the half mirror 320 between the Fourier transforming lens 19 and the CCD 20 are inclined at angles of 45 degrees to the corresponding optical paths such that the one piece type light pickup head has a plane of symmetry with respect to the common image-formation plane 201.

There will be described the steps of recording, reproducing and partially rewriting of data in the holographic recording and reproducing method.

Figure 3:
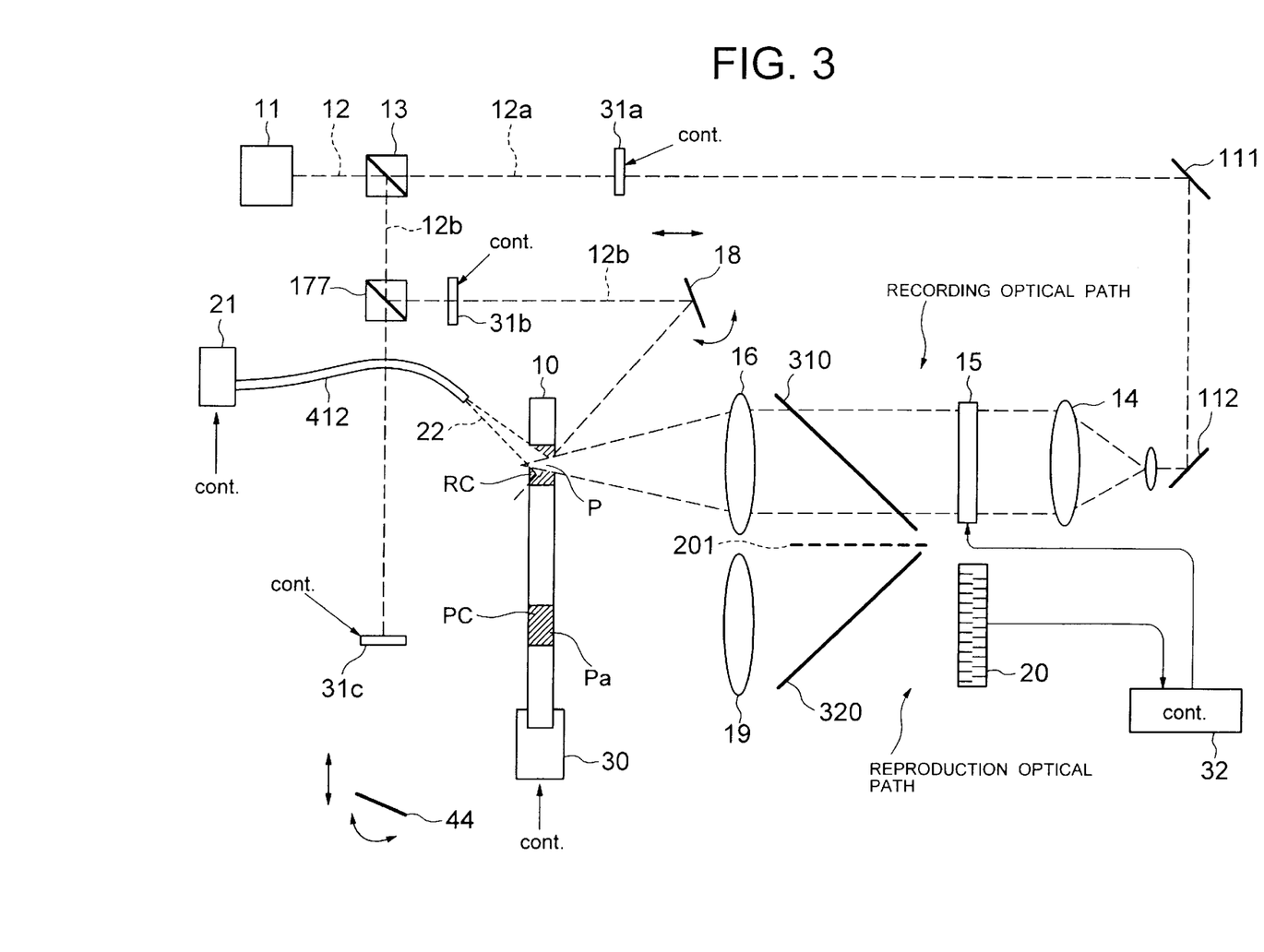

FIG. 3 shows the recording step in which the recording medium 10 is mounted to the n-axis movable stage device 30 (where n denotes 1 or 2) serving as a support portion, and a target recording channel RC thereof is moved to a recording position P in response to a control signal forwarded from the controller 32. The pre-irradiation light beam is sufficiently converged to prevent the pre-irradiation light from leaking to an undesired portion of the recording medium. Upon providing a light shielding member and mask made of the absorbing material absorbing the pre-irradiation light, the light shielding member is mounted around the light outlet portion of the irradiation light source 21 and also the recording material is masked so as to avoid unnecessary illuminating of the pre-irradiation light. A 313 nm bandpass filter (not shown) is mounted on the irradiation light source 21 to generate a pertinent light beam for the pre-irradiation light. The irradiation of the pre-irradiation light for 30 sec. to the recording material performs an initialization of the recording channel to make the photochromism appear.

Then, the 313 nm bandpass filter is replaced with a 436 nm bandpass filter (not shown) for the gate light beam in the irradiation light source 21. The controller 32 forwards the desired two-dimensional digital data to the SLM 15, at the same time or after a predetermined time delay for the illumination of the gate light beam 22, the shutter 31a for the signal light beam and the shutter 31b for the recording reference light are opened to irradiate the signal light beam 12a and the recording reference light beam 12b into the recording medium 10 to start on the two-holographic recording to form an interference pattern of changes in refractive index within the light intersected portion thereof. After that, both the shutters are opened for a recording time period in accordance with the scheduling and at the same time the gate light beam is irradiated to the medium. Last, both the shutters are closed and the irradiation of the gate light beam is ended. In this way, a holographic recording on a first page is finished for a certain incident angle. As a matter of course, the shutter 31c for reproducing reference light is kept close during the recording.

In carrying out of angle-multiplexed holographic recording, the galvanic mirror 18 is rotated a predetermined angle and parallel moved in position a predetermined amount so that the incident angle of the recording reference light beam 12b on the recording medium 10 is changed and both the shutters are opened for desired recording time every incident angle. In this way, the angle-multiplexed holographic recordings are carried out one after another at one of the recording channels.

Figure 4:
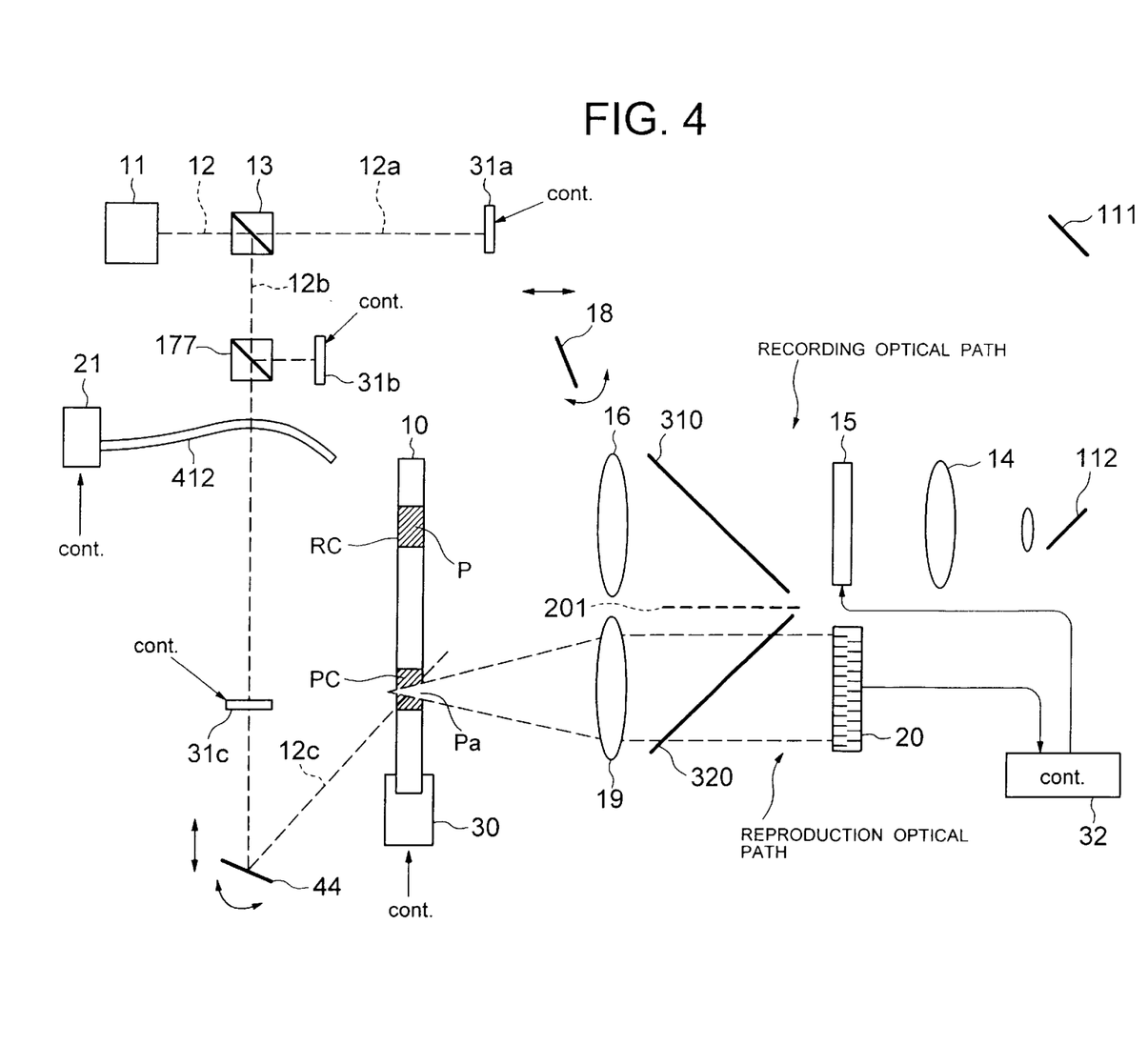

Next, FIG. 4 shows the reproduction step in which the shutters 31a and 31b are closed but the shutter 31c for the reproducing reference light is opened to irradiate the reproducing reference light beam 12c to the recording medium 10 at the reproduction position. The recording medium 10 mounted on the n-axis movable stage device 30 is moved with a parallel displacement to the predetermined position by the controller 32 such that the reproduction channel PC having data to be reproduced is disposed face to face with the pickup head. In this time, the rotation and the parallel movement of the galvanic mirror 44 are previously controlled in a such manner that the reproducing reference light beam 12c is incident on a position immediately opposite to the recording light beam 12b upon recording the page to be reproduced. Namely, the reproducing reference light beam 12c is made incident on the recording medium 10 so as to propagate in the reverse propagating direction of the recording reference light beam 12b, since the reproducing and the recording reference light beams 12c and 12b are parallel to each other. As a result, a phase conjugate wave (diffraction light) appears from the refractive-index grating of region Pa and propagates through the same side of the recording medium 10 as the side illuminated by the signal light beam 12a in the opposite propagating direction of the signal light beam 12a to the Fourier transforming lens 19. The Fourier transforming lens 19 receives the phase conjugate light and images a real image on the CCD 20 through the half mirror 320. That is, the Fourier transforming lens 19 reconstructs the recorded bright and dark dot pattern on the CCD 20. The CCD 20 converts the dot pattern into an electric digital data signal. Then the CCD 20 forwards the data to the controller 32 by which the original data is reproduced. In addition, the reflecting plane of the half mirror 320 partly reflects the phase conjugate light to the common image-formation plane 201 on which another real image is reconstructed. In other words, the phase conjugate wave reflected by the half mirror 320 is partly provided to the recording channel RC of the medium. However there is no damage of recorded data of the recording channel RC on the medium due to the phase conjugate wave. This because the gate light beam and recording reference light for the two-color holographic recording are not illuminated to the medium, so that the photorefractive phenomenon of the recording medium 10 does not occur with only the irradiation of the phase conjugate wave. Furthermore, a shutter (not shown) controlled by the controller 32 may be provided between the half mirrors 310 and 320 to prevent the phase conjugate wave from leaking to the recording optical path during the reproduction step. This configuration is useful for the two-color holographic recording without using the gate light beam in another embodiment of the invention.

Figure 5:
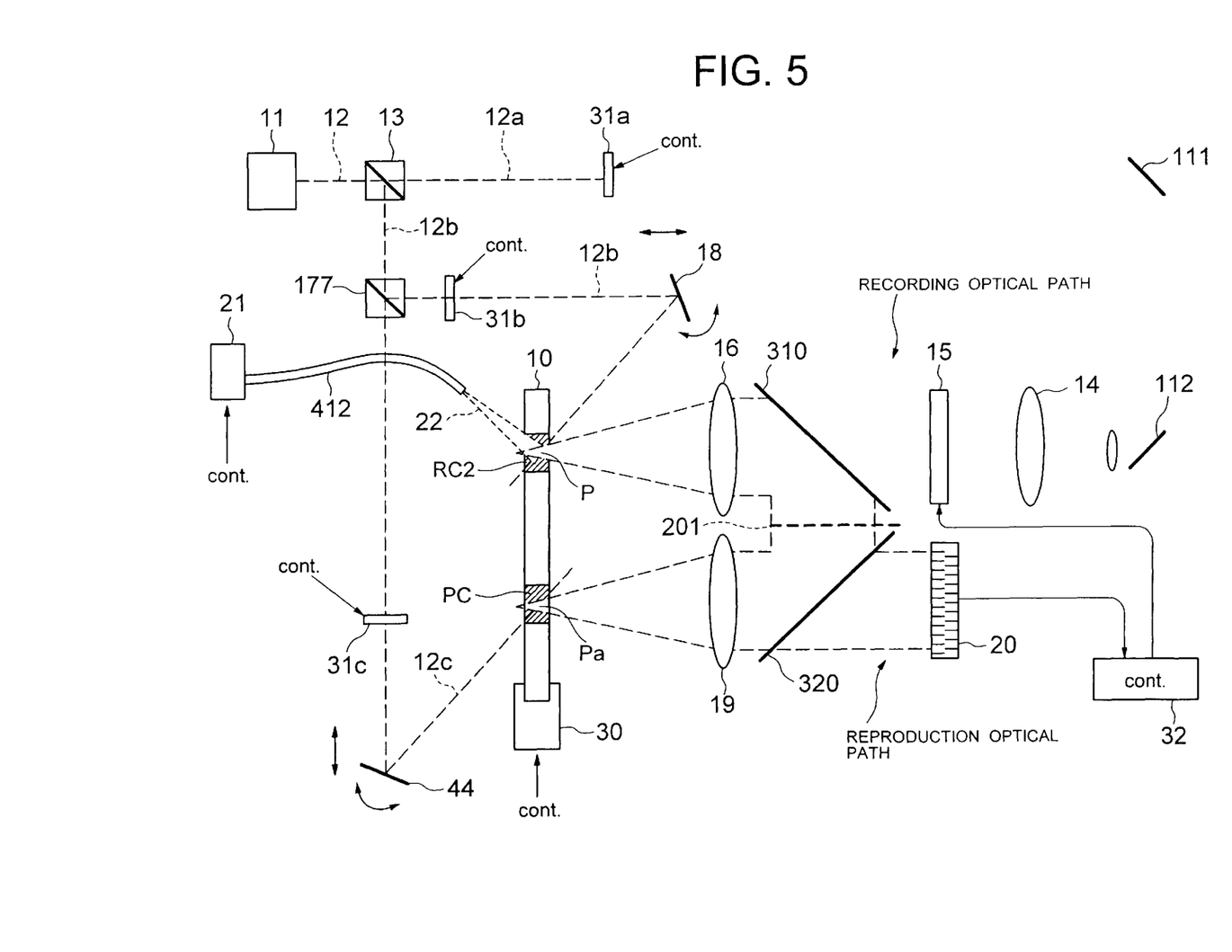

Next, FIG. 5 shows a rewriting step in which the recorded data in a channel is rewritten to another channel. The n-axis movable stage device 30 is driven by the controller 32 so that the recording medium 10 moves and the reproducing reference light beam 12c is incident on the recording channel PC to be rewritten. Then the ultraviolet rays of pre-irradiation light is illuminated to a predetermined portion adjacent to the recording channel PC to form a recording channel RC2 initialized so as to face the lens 16.

As shown in FIG. 5, only the shutter 31a is closed to cut off light entering the SLM 15 and the galvanic mirror 44 is driven in the same manner as the reproduction step. Through the shutter 31c opened, the reproducing reference light beam 12c is irradiated to the reproduction channel PC to generate the phase conjugate wave to reconstruct a real image on the common image-formation plane 201. The reproduced real image is used for an input image and provided through the half mirror 310 and the Fourier transforming 16 to the initialized channel RC2 of the recording medium 10. Namely, light appearing from the reproduced real image on the common image-formation plane 201 is used as a signal light and is incident on the recording medium 10 similar to the recording step, so that an interference pattern of changes in refractive index in the recording channel RC2 is formed within the light intersected portion of the reproduced signal light and the recording reference light beam 12b supplied through the shutter 31b opened. Those conditions are kept until a predetermined target page i.e., the target image data to be rewritten appears. In this way, the real image reconstructed from the reproduced phase conjugate wave is used as modulated light for the holographic recording instead of the SLM 15.

When the target page appears, the operation is switched by the controller 32 to a condition that the shutter 31c is closed to cut off the reproducing reference light beam 12c and the shutter 31a is opened in the same manner as shown in FIG. 3. In this case, the SLM 15 displays a new image data to be rewritten. Modulated light supplied from the SLM 15 is used as a signal light beam. In this way, the original and new image data are continuously recorded on the recording channel RC2.

After recording the new image data on the target page, the operation is switched again by the controller 32 back to the first stage to close the shutter 31a and open the shutter 31c as shown in FIG. 5, so that the remaining data is recorded on the basis of the reproduced real image obtained from the phase conjugate wave in succession.

The image data supplied from the SLM 15 is used for the data to be rewritten and the data supplied from the reproduced real image by the phase conjugate wave is used for the data not to be rewritten i.e., original settled data as it is. In this embodiment, since the recording material has a high response speed, the recording is processed from light to light at a high speed response. Therefore, the user will recognize the random access of data in the holographic recording and reproducing apparatus.

While reducing the required volume per channel and increasing the total number of the channels in a recording material with a constant volume, the recording capacity per channel decreases. The embodiment of the invention provides the reduction of the refresh operations required for the rewriting and the convenient usage equal to a general recording system capable of random access such as a hard disk and an optical disk. Further, the reduction of the required volume per channel may be obtained by the magnification of numerical apertures of the Fourier transforming and inverse Fourier transforming lenses in the invention. In addition, a tag corresponding to the type of a particular photo-refractive crystal may be previously attached to the recording medium 10, such that the tag is automatically read by a suitable sensor as the recording medium 10 is mounted on the movable stage device to allow the controller 32 to control predetermined movements and rotation of the recording medium 10.

The signal processing from light to light provides a direct rewriting operation in holographic recording and reproducing apparatus of the invention. Therefore the device configuration is simplified because any buffer memory is required for unnecessary data to be rewritten by the invention. Since there is no need to the conversion path from light to electricity or from electricity to light in the invention, a high speed processing is achieved for the holographic rewriting. Therefore, the users enjoy the convenient usage equal to other general recording systems capable of random access in the holographic recording and reproducing apparatus of the invention though it is a sequential recording system.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on a Japanese Patent Application No. 2000-332825 which is hereby incorporated by reference.

What is claimed is:

1. A holographic recording and reproducing apparatus for recording data on a recording medium and reproducing data from the recording medium, the recording medium being made of a photorefractive material, said apparatus comprising:

a support portion for detachably supporting the recording medium;

a recording-reference-light-beam-supplying-portion for supplying a coherent recording reference light beam having a first wavelength and propagating along a recording optical axis to a major surface of said recording medium;

a signal-light-beam-supplying-portion including a converging lens for converging a coherent signal light beam having the first wavelength which is modulated in accordance with image data, in an optical path into the recording medium such that said signal light beam intersects with the recording reference light beam to produce an optical interference pattern of refractive index with said reference and signal light beams within said recording medium;

a reproducing-reference-light-beam-supplying-portion for supplying into the recording medium a coherent reproducing reference light beam having the first wavelength and propagating in an opposite direction along said recording optical axis of the recording reference light beam to generate a phase conjugate wave from a refractive-index grating of the optical interference pattern;

a photo-detecting portion including a receiving lens for receiving said phase conjugate wave and a photo-detector for detecting the dot pattern imaged with said phase conjugate wave to reproduce the image data; and a light transferring portion for making a common image-formation plane to said receiving lens and said converging lens to transfer said phase conjugate wave received from said receiving lens to said converging lens in such a manner that said receiving lens reconstructs a real image of the image data on the common image-formation plane, and during the irradiation of the recording reference light beam, forwarding a reproduced light from the real image through said converging lens to converge it into the recording medium in such a manner that said reproduced light intersects with the recording reference light beam to produce another optical interference pattern of refractive index in said recording medium.

2. A holographic recording and reproducing apparatus according to claim 1, wherein said light transferring portion includes half mirrors symmetrically disposed with respect to said common image-formation plane in optical paths of said signal-light-beam-supplying-portion and said photo-detecting portion respectively.

3. A holographic recording and reproducing apparatus according to claim 1, wherein said receiving lens and said converging lens are Fourier transforming lenses symmetrically disposed with respect to said common image-formation plane in optical paths of said signal-light-beam-supplying-portion and said photo-detecting portion respectively.

4. A holographic recording and reproducing apparatus according to claim 1, wherein said recording medium has a parallel plate shape.

5. A holographic recording and reproducing apparatus according to claim 1, further comprises a gate-light-beam-supplying-portion for irradiating a gate light beam having a second wavelength to a region intersected with said signal light beam and said recording reference light beam within the recording medium in a limited manner to enhance a recording sensitivity of said recording medium.

6. A holographic recording and reproducing apparatus according to claim 1, further comprises a pre-irradiation-beam-supplying-portion for irradiating a pre-irradiation beam having a third wavelength to color said recording medium.

7. A holographic recording and reproducing method for recording data on a recording medium and reproducing data from the recording medium, the recording medium being made of a photorefractive material, said method comprising the steps of:

making a coherent recording reference light beam having a first wavelength and propagating along a recording optical axis incident onto a major surface of the recording medium;

converging by a converging lens a coherent signal light beam having the first wavelength which is modulated in accordance with image data, in an optical path into the recording medium such that said signal light beam intersects with the recording reference light beam to produce an optical interference pattern of refractive index with said reference and signal light beams within said recording medium;

making a coherent reproducing reference light beam having the first wavelength incident to the recording medium in such a manner that the reproducing reference light beam propagates in an opposite direction along said recording optical axis of the recording reference light beam to generate a phase conjugate wave from a refractive-index grating of the optical interference pattern;

providing a receiving lens for receiving said phase conjugate wave and a photo-detector for detecting the dot pattern imaged with said phase conjugate wave to reproduce the image data;

making image-formation planes of said receiving lens and said converging lens coincide with each other to generate a common image-formation plane producing a phase conjugate wave by irradiating the reproducing reference light beam to a reproduction channel of the refractive-index grating previously recorded in the recording medium in such a manner that said receiving lens reconstructs a real image of the image data on the common image-formation plane of said receiving lens and said converging lens; and during the irradiation of the recording reference light beam, forwarding a reproduced light from the real image to said converging lens to converge it into the recording medium in such a manner that said reproduced light intersects with the recording reference light beam to produce another optical interference pattern of refractive index at a different portion away from said reproduction channel in said recording medium.

8. A holographic recording and reproducing method according to claim 7, further comprising a step of switching an operation, from the forwarding step of the reproduced light to said converging lens, to the irradiating step of converging by the converging lens a coherent signal light beam having the first wavelength which is modulated in accordance with another image data into the recording medium, simultaneously making the recording reference light beam incident onto the recording medium, to produce another optical interference pattern of refractive index following to said different portion of said reproduction channel.

9. A holographic recording and reproducing method according to claim 7, further comprising a step of irradiating a gate light beam having a second wavelength to a region intersected with said signal light beam and said recording reference light beam within the recording medium in a limited manner to enhance a recording sensitivity of said recording medium.

10. A holographic recording and reproducing method according to claim 7, further comprising a step of irradiating a pre-irradiation beam having a third wavelength to color said recording medium.

11. A holographic recording and reproducing apparatus for recording data on a recording medium and reproducing the data from the recording medium, the recording medium being made of a photosensitive material, said apparatus comprising:

a recording optical path including a lens for converging a coherent signal light beam onto the recording medium illuminated with a reference light beam to record the data as a refractive-index grating within said recording medium;

a reproduction optical path along which a phase conjugate wave travels, wherein the phase conjugate wave propagates from the refractive-index grating to a photo-detector for reproducing the image data and wherein the phase conjugate wave is generated with irradiation of a reference light beam; and a light transferring portion for transferring said phase conjugate wave into said recording optical path in such a manner that said lens converges said phase conjugate wave onto the recording medium illuminated with the reference light beam to record the data as another refractive-index grating within said recording medium.

12. A holographic recording and reproducing apparatus according to claim 11, wherein said light transferring portion includes at least one mirror disposed in said reproduction optical path so as to reflect said phase conjugate wave to said recording optical path.

13. A holographic recording and reproducing apparatus according to claim 11, wherein said lens is a Fourier transforming lens.

14. A holographic recording and reproducing apparatus according to claim 11, wherein said recording medium has a parallel plate shape.

15. A holographic recording and reproducing apparatus according to claim 11, further comprising a gate-light-beam-supplying-portion for irradiating a gate light beam to the recording medium, the gate light beam enhancing a recording sensitivity of said recording medium.

16. A holographic recording and reproducing apparatus according to claim 11, wherein said recording optical path and said reproduction optical path are disposed at a same side with respect to said recording medium.

17. A holographic recording and reproducing apparatus for recording data on a recording medium and reproducing data from the recording medium, said apparatus comprising:

recording optics that supply a signal light beam to the recording medium while the recording medium is illuminated with a record reference light beam, wherein the signal light beam and the record reference light beam generate first record data as a first refractive-index grating within said recording medium;

reproduction optics that output reproduction light from the refractive-index grating when the recording medium is irradiated with a reproduction reference light beam; and transfer optics that transfer the reproduction light to the recording medium while the recording medium is illuminated with the record reference light beam, wherein the reproduction light and the record reference light beam generate second record data as a second refractive-index grating within said recording medium, wherein the recording optics comprises a lens that converges the signal light beam onto the recording medium, wherein said reproduction light comprises a phase conjugate wave, and wherein the reproduction optics guide the phase conjugate wave such that the phase conjugate wave propagates from the refractive-index grating, wherein said transfer optics transfers the phase conjugate wave to at least a portion of the recording optics such that the lens converges the phase conjugate wave onto the recording medium.

18. A holographic recording and reproducing apparatus according to claim 17, wherein said reproduction optics supplies the phase conjugate wave to a photo-detector.

* * * * *